United States Patent [19]

Brand

[11] Patent Number: 4,560,119
[45] Date of Patent: Dec. 24, 1985

[54] LIGHTWEIGHT AIRCRAFT

[76] Inventor: Rolf Brand, 212 N. Mecklenburg Ave., South Hill, Va. 23970

[21] Appl. No.: 614,772

[22] Filed: May 29, 1984

Related U.S. Application Data

[63] Continuation of Ser. No. 492,704, May 9, 1983, abandoned, and a continuation-in-part of Ser. No. 213,458, Dec. 5, 1980, Pat. No. 4,382,566.

[51] Int. Cl.⁴ .............................................. B64C 1/16
[52] U.S. Cl. ........................................ 244/13; 244/54; 244/67; 244/DIG. 1.4
[58] Field of Search ...................... 244/DIG. 1, 13, 65, 244/67, 54, 55, 60, 87, 117 R, 119

[56] References Cited

U.S. PATENT DOCUMENTS

| D. 140,113 | 1/1945 | Biasell | 244/13 |
|---|---|---|---|
| 899,350 | 9/1908 | Steinhaus | 244/DIG. 1 |
| 2,005,728 | 6/1935 | Burgess | 244/65 |
| 3,013,749 | 12/1961 | Dunham | 244/65 |
| 4,249,711 | 2/1981 | Godbersen | 244/DIG. 1 |

FOREIGN PATENT DOCUMENTS

| 2650467 | 5/1978 | Fed. Rep. of Germany | 244/67 |
|---|---|---|---|
| 421136 | 2/1911 | France | 244/DIG. 1 |
| 18081 | 2/1914 | France | 244/DIG. 1 |
| 478724 | 1/1916 | France | 244/67 |

*Primary Examiner*—Galen L. Barefoot
*Attorney, Agent, or Firm*—Lalos, Keegan, Marsh, Bentzen & Kaye

[57] ABSTRACT

An ultralightweight aircraft including a principal longitudinally disposed load-carrying member and a wing structure supported by the load-carrying member and positioned in a horizontal plane spaced a distance below or above the horizontal plane of the load-carrying member. A housing is attached to and depends from the load-carrying member, an operator's station is disposed within the housing, the wing structure is attached to the housing and a landing gear system connected to a lower surface of the housing. A rudder and elevator assembly is mounted on the load-carrying member aft of the wing structure. A propeller is mounted on the load-carrying member between the wing structure and the rudder and elevator assembly for rotation about a longitudinal centerline of the load-carrying member. An engine is directly mounted on the load-carrying member, and a belt system drivingly connects the output of the engine to the propeller. A tail support structure may be connected to the aft end of the load-carrying member, and it includes a tubular support member disposed longitudinally beneath and in the same vertical plane as the load-carrying member. The support member has a forward end disposed forward of the propeller and the engine and an aft end angling up so that it is positioned closer to the load-carrying member than the forward end. Bracing structure mounts the support member to the load-carrying member.

25 Claims, 3 Drawing Figures

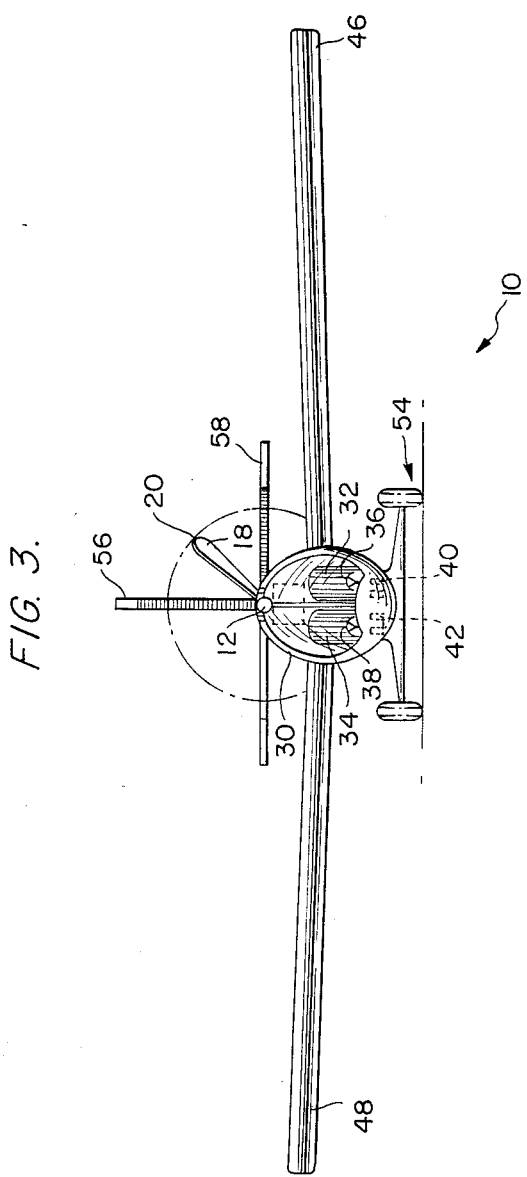

LIGHTWEIGHT AIRCRAFT

BACKGROUND OF THE INVENTION

This application is a continuation of application Ser. No. 492,704, filed May 9, 1983, now abandoned, and a continuation-in-part of Ser. No. 213,458 filed on Dec. 5, 1980, to issue on May 10, 1983, as U.S. Pat. No. 4,382,566, which is hereby incorporated by reference in its entirety.

This invention relates to a lightweight aircraft and more particularly to an ultralightweight aircraft having a novel propeller assembly wherein the propeller is mounted for rotation about the longitudinal axis of the main longitudinal load-carrying member.

The present invention represents an improvement over applicant's lightweight aircraft disclosed in the aforementioned application. In particular, there has been a need to provide a housing for the operator which provides a degree of protection from the elements. Also, it has been found desirable to provide a novel wing mounting assembly which mounts the wing below or above the main longitudinal member about which the propeller rotates. Further, a stronger tail support structure has been found necessary to replace the wire bracing structure illustrated in the prior application.

OBJECTS OF THE INVENTION

Accordingly, it is the principal object of the present invention to provide a novel ultralightweight aircraft design.

Another object of the present invention is to provide an improved ultralightweight aircraft wherein the propeller is mounted for rotation about the main longitudinal load-carrying member of the aircraft.

A further object of the present invention is to provide a novel ultralightweight aircraft having a housing in which the operator's station is mounted.

A still further object of the present invention is to provide a novel ultralightweight aircraft design wherein the wing structure is mounted beneath or above the main longitudinal load-carrying structure.

Another object of the present invention is to provide an improved ultralightweight aircraft design having a novel tail support structure.

Other objects and advantages of the present invention will become more apparent to those persons having ordinary skill in the art to which the present invention pertains from the following description taken in conjunction with the accompanying drawings.

THE DRAWINGS

FIG. 3 is a front-elevational view of the aircraft of FIG. 1.

DESCRIPTION OF THE INVENTION

Figure 1:
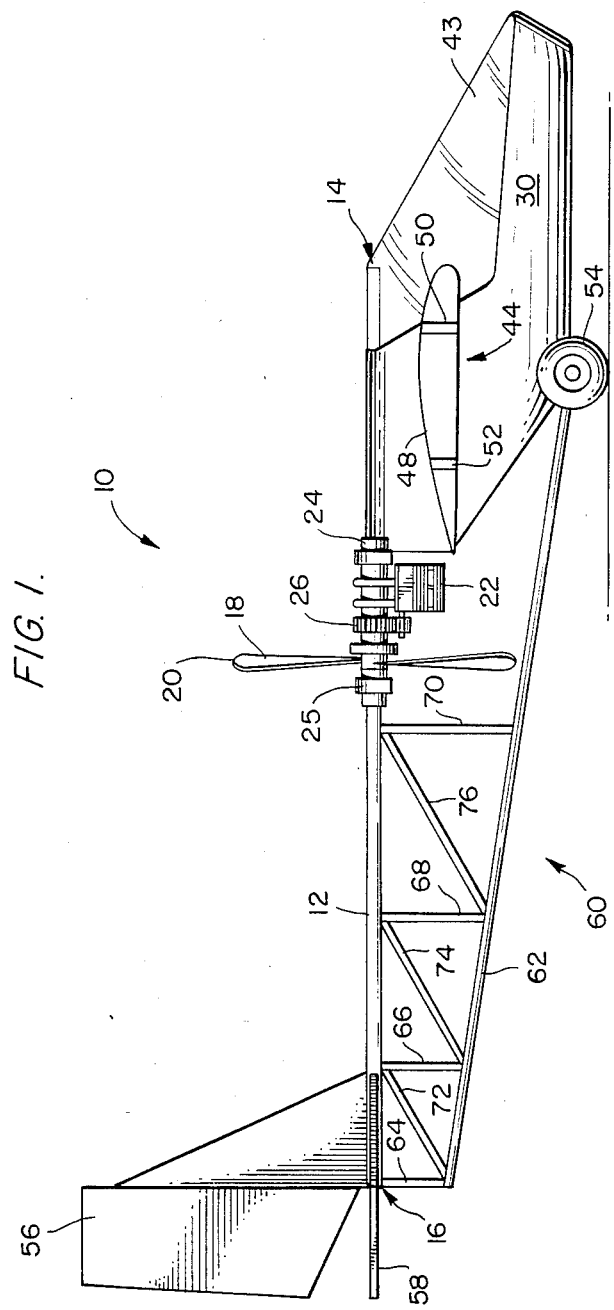
FIG. 1 is a side-elevational view of an ultralightweight aircraft showing an embodiment of the present invention.

Referring to the drawings, an embodiment of the present invention is illustrated generally at 10. Aircraft 10 includes a main longitudinal load-carrying member 12 having a forward end shown generally at 14 and an aft end shown generally at 16. A propeller 18 having an outer tip 20 is mounted for concentric rotation about the longitudinal axis of load-carrying member 12, as best described in the aforementioned parent application. Engine 22 is mounted to the load-carrying member 12 by a cup mounting assembly, which is adjustable, shown at 24 and 25. Cup mounting assembly 24 and 25 is better described in applicant's copending application, Ser. No. 403,697, filed July 30, 1982, the contents of which are hereby incorporated by reference in their entirety. Output of engine 22 is drivingly connected to the propeller 18 by suitable reduction gearing shown at 26 in FIG. 1.

Figure 2:
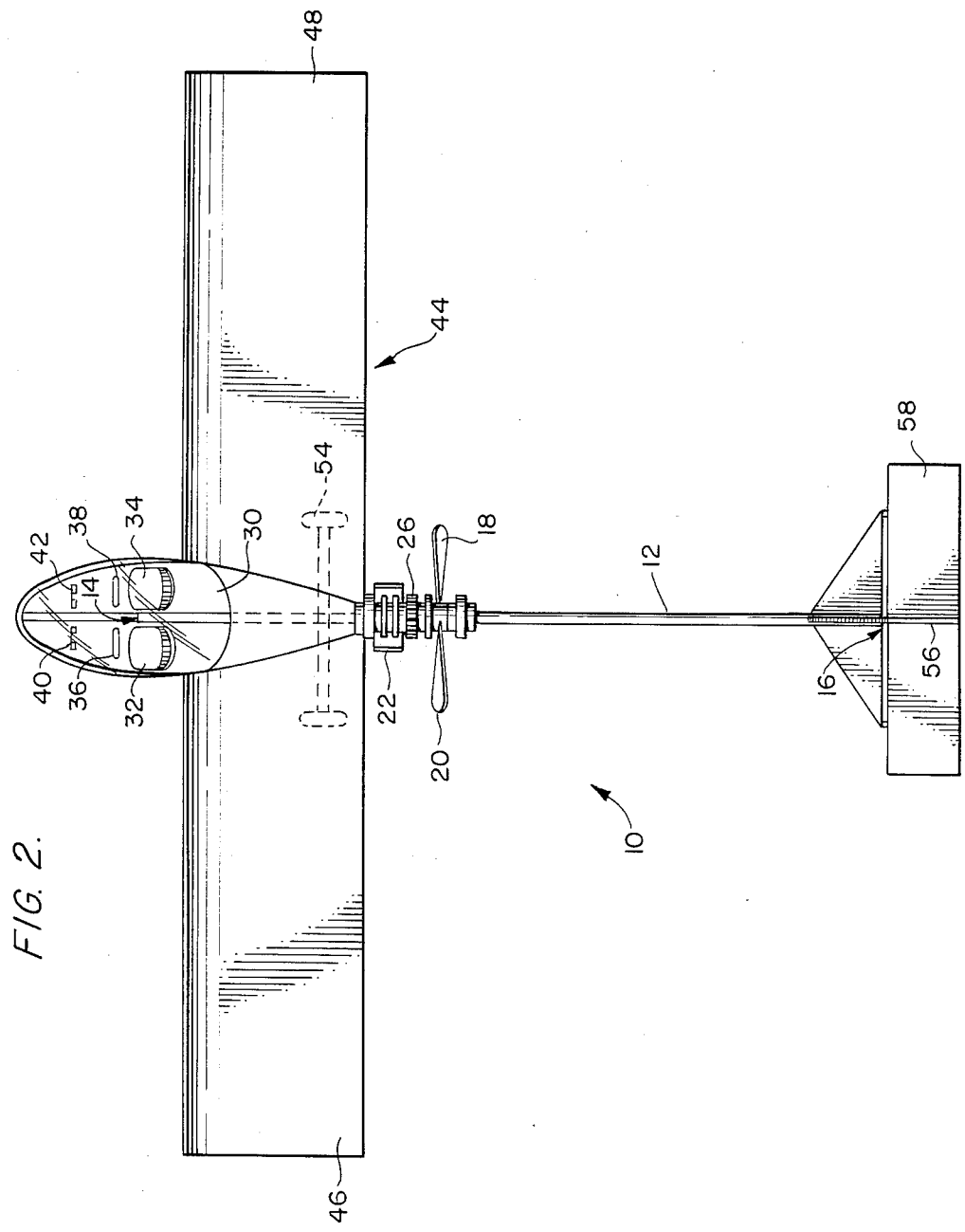
FIG. 2 is a top plan view of the aircraft of FIG. 1.

A housing 30 which may be formed from any suitable lightweight high strength material, including any suitable composite structures with polyester or epoxy resins in a matrix with glass, kevlar or carbon fibers, is mounted to forward end 14 of member 12 and depends from that member. Positioned in housing 30, and as best shown in FIGS. 2 and 3, are operator's stations 32 and 34. Suitable elevator and aileron controls are shown at 36 and 38 positioned in front of stations 32 and 34, and suitable rudder controls are positioned forward thereof as shown at 40 and 42. It is also within the scope of of the present invention to provide a housing 30 adapted to hold only 1 person, as well as to provide a housing which seats an operator and a passenger. Housing 30 includes a suitable windshield 43 positioned in front of stations 32 and 34 to provide visibility to the occupants as well as a degree of protection from the elements.

Wing structure shown generally at 44 is mounted forward of propeller 18 and engine 22 and is positioned beneath load-carrying member 12 as best shown in FIGS. 1 and 3. Wing structure 44 includes port wing section 46 and starboard wing section 48 each of which is secured to opposite sides of housing 30. It is further seen in FIG. 1 that wing structure 44 includes a leading edge spar 50 and a trailing edge spar 52. One embodiment of the present invention secures the opposing wing sections in place by having their spars extend through the housing past the load-carrying member and bolted to the spar from the opposing wing. A second embodiment includes the spars ending at the housing and a strut brace provided outside the housing and connecting the spars to the load-carrying member or to the housing.

Suitable landing gear assemblies 54 are mounted to housing 30 as shown in FIG. 3. Mounted to aft end 16 of the load-carrying member are conventional rudders 56 and elevators 58. A novel tail support structure however is provided as is shown generally at 60. Tail support structure 60 includes a tubular member 62 attached at its forward end to landing gear assembly 42 and supported from longitudinal member 12 by depending members shown at 64, 66, 68 and 70. Bracing members diagonally positioned between the depending support members, adjacent the support members, and extending aftward from load-carrying member 12 to tubular member 62 are shown at 72, 74 and 76.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A lightweight aircraft comprising:
   a functionally-continuous, longitudinally-disposed fuselage structure positioned and adapted to carry compression, tensile, bending, and torsional forces of said lightweight aircraft, an offset wing structure supported by said fuselage structure and positioned in a generally horizontal plane spaced a distance from the generally horizontal plane of said fuselage structure, a tail assembly mounted on said fuselage structure aft of said offset wing structure, a propeller means mounted on said load-carrying member between said offset wing structure and said tail assembly for concentric rotation about a longitudinal line of said fuselage structure, said propeller means comprising the sole propelling means for said lightweight aircraft, an engine means mounted on said fuselage structure, said engine means creating general aircraft structural torque forces transmitted to said lightweight aircraft and propeller torque forces transmitted directly to said propeller means, a connecting means positioned outside of said fuselage structure for drivingly connecting said engine means to said propeller means, an engine direct mounting means positioned on the outside of said fuselage structure adjacent said propeller means for mounting said engine means directly on said fuselage structure, said engine direct mounting means including a bracket means to which said engine means is attached, and further including a mechanical mounting means for fixedly and directly mounting said bracket means to said fuselage structure, said mechanical mounting means including a mechanical connection means extending between said bracket means and said fuselage structure for connecting and mechanically engaging and holding said bracket means to said fuselage structure, and said engine direct mounting means transmitting all said general aircraft structural torque forces directly to said fuselage structure and transmitting substantially all of the weight and torsional forces of said engine means directly to said fuselage structure.

2. The lightweight aircraft of claim 1 including, said mechanical connection means extending into said fuselage structure.

3. The lighweight aircraft of claim 1 including, a supporting means disposed forward of said propeller means for supporting said offset wing structure from said fuselage structure.

4. The lightweight aircraft of claim 3 including, said supporting means being disposed forward of said engine means.

5. The lightweight aircraft of claim 1 including, said fuselage structure comprising a metal, cylindrical tube.

6. The lightweight aircraft of claim 1 including, said bracket means being positioned generally aft of said offset wing structure.

7. The lightweight aircraft of claim 1 including, a drive sleeve disposed about said fuselage structure, said propeller means being secured to said drive sleeve, a bearing means positioned between said sleeve and said fuselage structure, and said connecting means causing said drive sleeve to rotate on said bearing means about said fuselage structure.

8. A lightweight aircraft comprising:

a functionally-continuous, longitudinally-disposed fuselage structure positioned and adapted to carry compression, tensile, bending and torsional forces of said lightweight aircraft, a housing attached to said fuselage structure, an operator's station disposed within said housing, a wing structure attached to said housing, a landing gear system attached to said housing, a tail assembly attached to said fuselage structure, a propeller means mounted on said fuselage structure between said housing and said tail assembly for concentric rotation about a longitudinal line of said fuselage structure, said propeller means comprising the sole propelling means for said lightweight aircraft, an engine means mounted on said fuselage structure, said engine means creating general aircraft structural torque forces transmitted to said lightweight aircraft and propeller torque forces transmitted directly to said propeller means, a connecting means positioned outside of said fuselage structure for drivingly connecting said engine means to said propeller means, an engine direct mounting means positioned on the outside of said fuselage structure adjacent said propeller means for mounting said engine means directly on said fuselage structure, said engine direct mounting means including a bracket means to which said engine means is attached and further including a mechanical mounting means for fixedly and directly mounting said bracket means to said fuselage structure, said mechanical mounting means including a mechanical connection means extending between said bracket means and said fuselage structure for connecting and mechanically engaging and holding said bracket means to said fuselage structure, and said engine direct mounting means transmitting all said general aircraft structure torque forces directly to said fuselage structure and transmitting substantially all of the weight and torsional forces of said engine means directly to said fuselage structure.

9. The lightweight aircraft of claim 8 including, said mechanical connecting means extending into said fuselage structure.

10. The lightweight aircraft of claim 8 including, said bracket means being positioned aft of the mounting of said wing structure to said housing.

11. The lightweight aircraft of claim 8 including, said wing structure being mounted to opposite sides of said housing.

12. The lightweight aircraft of claim 8 including, a passenger's station disposed in said housing adjacent said operator's station.

13. The lightweight aircraft of claim 8 including, said housing including a windshield disposed in front of said operator's station.

14. The lightweight aircraft of claim 8 including, said housing being positioned forward of said propeller means and of said engine means.

15. The lightweight aircraft of claim 8 including, said wing structure being positioned in a horizontal plane spaced a distance from the horizontal plane of said fuselage structure.

16. The lightweight aircraft of claim 15 including, said wing structure being positioned below said fuselage structure.

17. The lightweight aircraft of claim 8 including,
said fuselage structure comprising a metal, cylindrical tube.
18. The lightweight aircraft of claim 8 including,
a tail support structure including a tubular support member disposed longitudinally and in the same vertical plane as said fuselage structure,
said tail support structure including a tubular support member disposed longitudinally and in the same vertical plane as said fuselage structure,
said support member having a forward end disposed forward of said propeller means and said engine means and an aft end positioned closer to said fuselage structure than said forward end, and
a member connecting means for connecting said support member to said fuselage structure.
19. The lightweight aircraft of claim 18 including,
said forward end being connected to said landing gear system.
20. The lightweight aircraft of claim 8 including,
said housing being directly mounted on its upper surface to said fuselage structure.
21. The lightweight aircraft of claim 8 including,
said housing depending from said fuselage structure.
22. The lightweight aircraft of claim 8 including,
said wing structure being directly mounted on said housing.
23. The lightweight aircraft of claim 8 including,
said bracket means being positioned aft of said housing.
24. The lightweight aircraft of claim 8 including,
said landing gear system being directly mounted on said housing.
25. The lightweight aircraft of claim 8 including,
a drive sleeve disposed about said fuselage structure,
said propeller means being secured to said drive sleeve,
a bearing means positioned between said drive sleeve and said fuselage structure, and
said connecting means causing said drive sleeve to rotate on said bearing means about said fuselage structure.

* * * * *